(12) United States Patent
McGuire, Jr.

(10) Patent No.: US 8,837,080 B2
(45) Date of Patent: Sep. 16, 2014

(54) HARD DISK DRIVES WITH COMPOSITE HOUSINGS AND RELATED METHODS

(75) Inventor: James E. McGuire, Jr., Westerville, OH (US)

(73) Assignee: entrotech, inc., Columbus, OH (US)

( * ) Notice: Subject to any disclaimer, the term of this patent is extended or adjusted under 35 U.S.C. 154(b) by 0 days.

(21) Appl. No.: 13/096,524

(22) Filed: Apr. 28, 2011

(65) Prior Publication Data

US 2012/0275285 A1    Nov. 1, 2012

(51) Int. Cl.
*G11B 5/10* (2006.01)
*G11B 25/04* (2006.01)
*G11B 33/14* (2006.01)
*G11B 33/02* (2006.01)

(52) U.S. Cl.
CPC .......... *G11B 25/043* (2013.01); *G11B 33/1493* (2013.01); *G11B 33/022* (2013.01)
USPC .................. 360/99.15; 360/97.19; 360/99.17; 360/99.19; 360/99.21

(58) Field of Classification Search
CPC .................................. G11B 33/14; G11B 5/10
USPC .......... 360/97.02, 97.12, 97.19, 99.15, 99.17, 360/99.19, 99.21
See application file for complete search history.

(56) References Cited

U.S. PATENT DOCUMENTS

| | | |
|---|---|---|
| 4,306,259 A | 12/1981 | Saito et al. |
| 4,367,503 A | 1/1983 | Treseder |
| 4,642,715 A | 2/1987 | Ende |
| 4,686,592 A | 8/1987 | Carroll et al. |
| 4,855,849 A | 8/1989 | Jones et al. |
| 4,965,691 A | 10/1990 | Iftikar et al. |
| 5,025,335 A | 6/1991 | Stefansky |
| 5,150,267 A | 9/1992 | Reinisch et al. |
| 5,175,657 A | 12/1992 | Iftikar et al. |
| 5,214,550 A | 5/1993 | Chan |
| 5,233,491 A | 8/1993 | Kadonaga et al. |
| 5,235,481 A | 8/1993 | Kamo et al. |
| 5,243,495 A | 9/1993 | Read et al. |
| 5,247,410 A | 9/1993 | Ebihara et al. |
| 5,253,129 A | 10/1993 | Blackborow et al. |
| 5,270,887 A | 12/1993 | Edwards et al. |

(Continued)

FOREIGN PATENT DOCUMENTS

| | | |
|---|---|---|
| EP | 0 546 680 | 6/1993 |
| JP | 6-218799 | 8/1994 |
| WO | WO 2005/117018 | 12/2005 |

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Wayne Young
*Assistant Examiner* — Carlos E Garcia
(74) *Attorney, Agent, or Firm* — The Griffith Law Firm, AP.; Lisa M. Griffith

(57) ABSTRACT

Improved hard disk drives of the invention comprise a composite housing, wherein the composite housing comprises a base and a cover, wherein at least a portion of the composite housing comprises a laminate of at least one rigid plastic layer and at least one metal coating. Methods for forming the same are also disclosed.

31 Claims, 3 Drawing Sheets

(56) References Cited

U.S. PATENT DOCUMENTS

| | | |
|---|---|---|
| 5,282,099 A | 1/1994 | Kawagoe et al. |
| 5,317,463 A | 5/1994 | Lemke et al. |
| 5,454,157 A | 10/1995 | Ananth et al. |
| 5,536,917 A | 7/1996 | Suppelsa et al. |
| 5,587,854 A | 12/1996 | Sato et al. |
| 5,587,855 A | 12/1996 | Kim |
| 5,608,592 A | 3/1997 | Mizoshita et al. |
| 5,703,735 A | 12/1997 | Bleeke |
| 5,732,063 A | 3/1998 | Chen |
| 5,751,514 A | 5/1998 | Hyde et al. |
| 5,781,373 A | 7/1998 | Larson et al. |
| 5,837,934 A | 11/1998 | Valavanis et al. |
| 5,880,904 A | 3/1999 | Mizoshita et al. |
| 5,898,537 A | 4/1999 | Oizumi et al. |
| 5,969,901 A | 10/1999 | Eckberg et al. |
| 6,008,965 A | 12/1999 | Izumi et al. |
| 6,023,392 A | 2/2000 | Kim |
| 6,108,164 A | 8/2000 | Weber |
| 6,129,579 A | 10/2000 | Cox et al. |
| 6,168,459 B1 | 1/2001 | Cox et al. |
| 6,181,530 B1 | 1/2001 | Ratliff et al. |
| 6,226,143 B1 | 5/2001 | Stefanksy |
| 6,236,532 B1 | 5/2001 | Yanagisawa |
| 6,243,262 B1 | 6/2001 | Koo et al. |
| 6,258,432 B1 * | 7/2001 | Terada et al. ............... 428/64.1 |
| 6,317,286 B1 | 11/2001 | Murphy et al. |
| 6,339,521 B1 | 1/2002 | Durrum et al. |
| 6,392,838 B1 * | 5/2002 | Hearn et al. ............... 360/99.18 |
| 6,397,932 B1 | 6/2002 | Calaman et al. |
| 6,407,659 B2 | 6/2002 | Mochida et al. |
| 6,430,000 B1 | 8/2002 | Rent |
| 6,442,021 B1 | 8/2002 | Bolognia et al. |
| 6,469,864 B2 * | 10/2002 | Kamezawa et al. ......... 360/97.01 |
| 6,473,264 B2 | 10/2002 | Bae et al. |
| 6,480,353 B1 | 11/2002 | Sacks et al. |
| 6,525,899 B2 | 2/2003 | Hearn et al. |
| 6,560,064 B1 | 5/2003 | Hirano |
| 6,570,736 B2 | 5/2003 | Noda |
| 6,639,757 B2 | 10/2003 | Morley et al. |
| 6,646,821 B2 | 11/2003 | Bernett et al. |
| 6,650,961 B2 | 11/2003 | Deckers |
| 6,673,460 B2 | 1/2004 | Imai et al. |
| 6,678,112 B1 | 1/2004 | Kaneko |
| 6,693,767 B1 | 2/2004 | Butler |
| 6,762,909 B2 | 7/2004 | Albrecht et al. |
| 6,765,751 B2 | 7/2004 | Huang et al. |
| 6,785,082 B2 | 8/2004 | Fiorvanti et al. |
| 6,831,811 B1 | 12/2004 | Andrikowich et al. |
| 6,876,514 B1 | 4/2005 | Little |
| 6,934,118 B2 | 8/2005 | Hidaka et al. |
| 6,934,958 B2 | 8/2005 | Lin et al. |
| 6,940,687 B2 | 9/2005 | Hong et al. |
| 7,054,153 B2 | 5/2006 | Lewis et al. |
| 7,082,012 B2 | 7/2006 | Macpherson et al. |
| 7,119,984 B2 | 10/2006 | Macleod et al. |
| 7,130,149 B2 | 10/2006 | Hong et al. |
| 7,206,164 B2 | 4/2007 | Hofland et al. |
| 7,218,473 B2 | 5/2007 | Bernett et al. |
| 7,239,593 B2 | 7/2007 | Abe |
| 7,274,534 B1 | 9/2007 | Choy et al. |
| 7,295,399 B2 | 11/2007 | Konno et al. |
| 7,300,500 B2 | 11/2007 | Okada et al. |
| 7,301,776 B1 | 11/2007 | Wang et al. |
| 7,315,447 B2 * | 1/2008 | Inoue et al. ............... 361/679.48 |
| 7,330,334 B2 | 2/2008 | Shimizu et al. |
| 7,362,541 B2 | 4/2008 | Bernett et al. |
| 7,414,813 B2 | 8/2008 | Huynh |
| 7,420,771 B1 * | 9/2008 | Hanke et al. ............... 360/97.01 |
| 7,484,291 B1 | 2/2009 | Ostrander et al. |
| 7,508,622 B2 | 3/2009 | Martin et al. |
| 7,525,758 B2 * | 4/2009 | Abe ............... 360/97.21 |
| 7,616,400 B2 | 11/2009 | Byun et al. |
| 7,630,169 B2 | 12/2009 | Murakami |
| 7,684,146 B1 | 3/2010 | Andrikowich et al. |
| 7,813,129 B2 | 10/2010 | Van Der Werff |
| 7,821,735 B1 | 10/2010 | Bogacz et al. |
| 8,014,167 B2 | 9/2011 | Gunderson et al. |
| 8,018,687 B1 | 9/2011 | Little et al. |
| 8,248,777 B2 | 8/2012 | Prest |
| 8,274,755 B2 | 9/2012 | Ishima et al. |
| 8,427,787 B2 | 4/2013 | McGuire |
| 8,533,934 B2 | 9/2013 | McGuire |
| 8,593,760 B2 | 11/2013 | McGuire |
| 8,599,514 B2 | 12/2013 | McGuire |
| 2001/0042301 A1 | 11/2001 | Khuu |
| 2002/0149885 A1 | 10/2002 | Dague et al. |
| 2002/0196580 A1 | 12/2002 | Tsukahara et al. |
| 2003/0081349 A1 | 5/2003 | Bernett |
| 2003/0089417 A1 | 5/2003 | Bernett |
| 2003/0179488 A1 * | 9/2003 | Kant et al. ............... 360/97.01 |
| 2003/0179489 A1 * | 9/2003 | Bernett et al. ............... 360/97.01 |
| 2003/0223148 A1 | 12/2003 | Macleod et al. |
| 2004/0070867 A1 | 4/2004 | Kudo et al. |
| 2004/0150909 A1 | 8/2004 | Kimura |
| 2004/0169956 A1 | 9/2004 | Oba et al. |
| 2004/0184184 A1 | 9/2004 | Komatsu et al. |
| 2004/0207980 A1 | 10/2004 | Kobayashi |
| 2005/0013039 A1 | 1/2005 | Matsumura et al. |
| 2005/0041334 A1 | 2/2005 | Kim et al. |
| 2005/0094312 A1 | 5/2005 | Sato |
| 2005/0130457 A1 | 6/2005 | Nozaki et al. |
| 2005/0237708 A1 | 10/2005 | Chen |
| 2006/0050429 A1 | 3/2006 | Gunderson et al. |
| 2007/0002489 A1 | 1/2007 | Abe |
| 2007/0171567 A1 | 7/2007 | Choi et al. |
| 2008/0084631 A1 | 4/2008 | Chan et al. |
| 2008/0174910 A1 | 7/2008 | Hirono et al. |
| 2008/0212237 A1 * | 9/2008 | Uefune et al. ............... 360/254 |
| 2008/0226534 A1 | 9/2008 | Gidumal et al. |
| 2009/0073328 A1 | 3/2009 | Gunderson et al. |
| 2009/0073842 A1 | 3/2009 | Kim |
| 2009/0116141 A1 | 5/2009 | Brown |
| 2009/0183475 A1 | 7/2009 | Dauber et al. |
| 2011/0122567 A1 | 5/2011 | Cheah et al. |
| 2011/0212281 A1 * | 9/2011 | Jacoby et al. ............... 428/35.8 |
| 2012/0120562 A1 * | 5/2012 | Prest et al. ............... 361/679.01 |
| 2012/0275052 A1 | 11/2012 | McGuire |
| 2012/0275053 A1 | 11/2012 | McGuire |
| 2012/0275054 A1 | 11/2012 | McGuire |
| 2012/0275055 A1 | 11/2012 | McGuire |
| 2012/0275056 A1 | 11/2012 | McGuire |
| 2012/0275057 A1 | 11/2012 | McGuire |
| 2012/0275105 A1 | 11/2012 | McGuire |
| 2012/0275106 A1 | 11/2012 | McGuire |
| 2012/0275286 A1 | 11/2012 | McGuire |
| 2012/0275287 A1 | 11/2012 | McGuire |

OTHER PUBLICATIONS

"Donaldson Filtration Systems Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).
"Nd:YAG laser," http://en.wikipedia.org/wiki/Nd:YAG_laser Feb. 14, 2011).
Jones, Ian, "Clearweld (Knowledge Summary)," http://www.twi.co.uk/content/ksiaj001.html (Dec. 31, 2010).
Venkat, Sri et al., "Sealing Plastic Seams With Laser Welding," www.devicelink.com/mddi (May 31, 2008).
Warwick, Marcus et al., "Application Studies Using Through-Transmission Laser Welding of Polymers," http://www.twi.co.uk/content/spcmwapr2006.html (Apr. 25, 2006).

\* cited by examiner

HARD DISK DRIVES WITH COMPOSITE HOUSINGS AND RELATED METHODS

BACKGROUND OF THE INVENTION

The present invention relates generally to improved hard disk drives with composite housings and related methods.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of leakage (allowing both air flow into the hard disk drive housing and allowing gas outflow from the hard disk drive housing) include those paths existing at the junction of two mating components thereof. Those components include, for example, screws or other mechanical fasteners used to conventionally fasten multiple parts of the housing together. In addition, gasket seals and the like used to improve the seal between multiple components are often susceptible to at least some leakage. As gas such as helium leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Therefore, as discussed in U.S. Patent Publication No. 2003/0179489, despite the advantages of helium-filled drives, such drives have not been commercially successful. This is mainly due to problems associated with leakage of gas from within the drives over time. Unlike air-filled disk drives, helium-filled drives do not include a filtered port to equalize the pressure within the drive to the ambient pressure—which ensuing pressure differential contributes to increased leakage of gas. Thus, while prior art helium drives are completely "sealed" in the conventional sense, it is still possible for helium gas therein to leak out past conventional rubber gasket seals used to seal the top cover to the drive base. Such leakage is not surprising given the relatively smaller size (i.e., lower atomic weight) of the helium atoms in comparison to the constituent gases found in air (i.e., nitrogen and oxygen). That is, the rubber gasket seals on prior art drives allow the relatively smaller helium atoms to diffuse through the rubber membrane. Indeed, such prior art gasket seals do not provide hermetic seals with respect to air (i.e., the gasket seals are also permeable to the larger atoms of nitrogen and oxygen in air) since it is air that typically displaces the helium gas that leaks from the drive.

Most prior art gasket seals are only intended to keep relatively large contaminants such as dust or smoke from the interior of a disk drive. However, such gasket seals are preferred as compared to other, more permanent methods of sealing a drive for two main reasons. First, such seals typically do not outgas and, thus, do not contribute to the contamination of the interior of the drive. Secondly, such seals may be reused if necessary during the assembly of the disk drive, such as when an assembled drive fails to pass certification testing and must be "re-worked." Re-working a drive typically entails removing the top cover from the base and replacing a defective disk or read/write head while the drive is still in a clean room environment. The re-worked drive is then reassembled, which can even be done using the same rubber gasket seal positioned between the base and the top cover. Unfortunately, however, while such gasket seals are convenient, they simply often do not provide a sufficient hermetic seal to maintain the required concentration of helium (or other low density gas) within the disk drive for the desired service life of the drive.

In view of the potential for long-term performance problems, U.S. Patent Publication No. 2003/0179489 describes a disk drive assembly having a sealed housing. As described therein, a disc drive includes a base plate supporting a spindle motor and an actuator assembly. A structural cover is removably attached to the base plate to form an internal environment within the disc drive. The internal environment of the drive is filled with a low density gas such as helium, and a sealing cover is permanently attached to the base plate and the structural cover to form a hermetic seal that maintains a predetermined concentration of the low density gas within the internal environment over a service lifetime of the disc drive.

The disc drive further includes a first seal secured between the base plate and the structural cover to prevent contaminants from entering the internal environment of the disc drive. The first seal is formed from a material such as rubber that allows leakage of the low density gas from the internal environment at a sufficiently low rate so that the disc drive may be operated for a predetermined period of time in the absence of the sealing cover.

In one embodiment, the base plate includes a raised outer edge and the sealing cover includes a downward depending edge that is adhesively bonded within a groove formed between an outer surface of the structural cover and the raised outer edge of the base plate. Alternatively, the sealing cover may include a downward depending edge that is adhesively secured to an outer perimeter wall of the base plate. In an alternative embodiment, the sealing cover is soldered to a top surface of the raised outer edge of the base plate. Such assemblies purportedly create a hermetic seal that will maintain desired concentrations of helium (or other low density gases) within the drive over the operational lifespan of the drive (e.g., leaking helium at such a low rate that it would take over seventy years for the helium concentration to drop below a predetermined lower limit). However, such sealing covers are not without their limitations—e.g., those dimensional limitations discussed in U.S. Patent Publication No. 2003/0179489 and the potential interference of such sealing covers with electrical connectors, such as those associated with flex circuitry protruding from the disk drive. Thus, improvements are still needed.

In addition, while U.S. Patent Publication No. 2003/0223148 (corresponding to U.S. Pat. No. 7,119,984) discusses improved containment of helium within a hard disk drive, the methods therein rely on laser-based metal sealing of such drives. Further, such "sealing" of drives is incomplete in that it does not prevent leakage through valves and ports used to inject gas into disk drive housings once sealed as such. As described therein, a base can be combined with a cover by overlapping respectively corresponding coupling flanges of the base and cover with each other. The coupling flanges are then described as being jointed and fastened together by spot welding, but only if both of the base and cover are made of metal including iron. Alternatively, hermetic sealing to some extent is said to be guaranteed if seam-welding is effected by continuously carrying out spot welding. Alternatively, when the base and the cover are made of a metal other than iron or a resin material, the coupling flanges are described as being joined together by means such as wrap-seaming, screws, or riveting. Still further, if both the base and cover are made of metal including aluminum or made of a resin material, the coupling flanges are stated to be preferably jointed and fastened together by screws or rivets. Further, in the outer peripheral portion of the jointed coupling flanges, a frame composed of a pair of L-shaped frame elements can be attached to force the jointed coupling flanges to be closed up tightly. Each of these L-shaped frame elements are made of so-called engineering plastic, e.g., polyamide resin or polyphenylene sulfide resin, and have a sectional form with a recess corresponding to the outer shape of the jointed coupling flanges. In this case, the L-shaped frame elements are fixed to the jointed coupling flanges of the housing by adhesive or by welding the frame elements per se. Also see U.S. Pat. No. 6,762,909 for a description of laser welding of a disk drive's cover and base plate made of aluminum or other alloys. Similarly, U.S. Pat. No. 5,608,592 discusses how spot welding can be used to secure a base and cover of a disk drive housing.

U.S. Pat. No. 4,686,592 discloses a housing comprising a lower body portion and a cover portion. Lower body portion is stated to be cylindrical in shape, having a lip located towards the outer periphery and a ledge associated therewith. Cover portion is stated to have a lip portion along its outer periphery. The inner and outer diameter of the lips are selected so that the two lips nest with one another when the cover portion is placed over the lower body portion, i.e., the outer diameter of the lower body portion's lip is selected to be greater than the inner diameter of the cover portion's lip. Further, the height of the cover portion's lip is selected with respect to the height of the lower body portion's lip so that a groove is formed for accommodating the outer periphery of the disk. Adhesives, such as epoxy, can be applied in the groove to assist in fixedly securing the disk within the groove. The disk is further secured in the groove by the clamping action provided by the cover portion and the lower body portion. Alternative methods for securing the cover portion to the lower body portion described therein include: threading, cam-locking, radial crimping, laser welding, ultrasonic welding, and the like.

U.S. Pat. Nos. 6,392,838 and 6,525,899 disclose a disk drive assembly purportedly hermetically encased within a metallic can. The metallic can comprises a top and bottom housing. Each housing component includes a sealing flange extending around its periphery. After the disk drive assembly is securely placed into the bottom housing, the top and bottom housings are mated and sealed together by forming a seam seal with the seal flanges. Also disclosed is use of a metallic gasket seal having a C-shaped cross-sectional area to purportedly hermetically seal a disk drive assembly. The C-seal includes a base layer and a plating layer, with the length of the seal extending the periphery of the disk drive base, similar to conventional elastomer gasket seals. After the disk drive cover is placed over the disk drive base and C-seal, the cover is clamped, thus compressing the C-seal. The resulting compression forces the plating layer to fill surface asperities in the area of the disk drive cover and base that contact the C-seal. These configurations purportedly provide assemblies with atmosphere leak rates of less than one cubic centimeter per $10^8$ seconds or 5% of the volume of the sealed atmosphere over ten years.

U.S. Pat. No. 5,454,157 describes a disk drive assembly containing a metallic base and cover. In order to minimize escape of helium or nitrogen contained therein (via porosity in the metallic base and cover plates), a special electrostatic coating process and material called "E-coat" are used. E-coating, which is said to be a commercially available coating material and is known to be an insulative epoxy material, is applied to the surfaces of the base and cover as well as all other surfaces making up the hermetically sealed chamber. Such application of the E-coating takes place before the plates are assembled together. Every surface, inner and outer, of each plate is completely coated with a black E-coating as such. With the E-coating applied, the overall sealed chamber's porosity is purportedly lowered ninety-seven percent to an acceptable amount in order to contain the helium and nitrogen gas.

Elimination of or minimization of leakage is desired for not only better containment of gas within a hard disk drive, but for other reasons as well. One such reason relates to a reduction of complications arising from electromagnetic interference. Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit. EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps. It is known that EMI frequently affects the reception of AM radio in urban areas. It can also affect cell phone, FM radio, and television reception, although to a lesser extent. EMI can similarly affect performance of a computer.

In conventional disk drives, unwanted and potentially problematic EMI wavelengths can enter a disk drive through a number of places. For example, similar to paths of gas leakage, such wavelengths can enter disk drive housings around screws used to hold multiple components of the housing together.

Within integrated circuits, the most important means of reducing EMI are: the use of bypass or "decoupling" capacitors on each active device (connected across the power supply and as close to the device as possible), risetime control of high-speed signals using series resistors, and $V_{CC}$ filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

Another source of potential hard disk drive failure stems from electrostatic discharge (ESD). ESD refers to a sudden and momentary electric current that flows between two objects at different electrical potentials. The term is usually used in the electronics and other industries to describe momentary unwanted currents that may cause damage to electronic equipment. Ways to eliminate problematic ESD are in need of improvement as performance demands of hard disk drives increase.

While the aforementioned problems typically arise based on events and/or materials external to a disk drive, other problems may arise based on events and/or materials internal to a disk drive. That is, design of components within conventional disk drives can contribute to hard disk drive failure. For example, plastic components are susceptible to outgassing and components made from conductive materials are prone to shedding of particles, both of which can cause catastrophic disk failure.

In view of the number of potential problems impacting effective and long-term performance of hard disk drives, alternative methods and apparatus for improved hard disk drives are desired. Most desired are those methods and apparatus with improved efficiency and reliability over conventional attempts to provide the same.

SUMMARY OF THE INVENTION

Improved hard disk drives of the invention comprise a composite housing, wherein the composite housing comprises a base and a cover, wherein at least a portion of the composite housing comprises a laminate of at least one rigid plastic layer and at least one metal coating. In one embodiment, the at least one metal coating comprises at least one exterior surface of the housing. In a further embodiment, the at least one metal coating comprises essentially the entire exterior surface of the housing. With such improved composite housings, hard disk drives of the invention are capable of being more effectively and more efficiently hermetically sealed among other advantages.

Although many materials may suitably be used for each of the rigid plastic layer and the at least one metal coating, in one embodiment the rigid plastic layer comprises polycarbonate, polybutylterepthalate, or a combination thereof. Similarly, in one embodiment the metal coating comprises aluminum, chrome, copper, stainless steel, or a combination thereof. In an exemplary embodiment, the laminate of the composite housing comprises more than one metal coating and a most exterior metal coating comprises at least one of chrome or stainless steel.

Each of the rigid plastic layer and the metal coating may have any suitable thickness. According to one aspect of the invention, the entire exterior surface of the housing comprises a uniformly thick coating of the same metal or combinations thereof. According to another aspect of the invention, thickness of the rigid plastic layer is greater than thickness of the metal coating laminated thereto. Advantageously, a major portion of the composite housing comprises plastic in an exemplary embodiment such that benefits associated with use of a rigid plastic can be maximized. In one embodiment, at least one rigid plastic layer comprises a molded plastic base component of the composite housing.

A method of forming improved hard disk drives comprises steps of: providing the cover and the base for the housing, wherein at least one of the cover and the base comprises a rigid plastic layer; optionally, positioning a sealing material between the cover and the base for sealing engagement of the housing; enclosing the cover and the base around components internal to the hard disk drive; optionally, evacuating and filling the hard disk drive with a desired gaseous medium when the desired gaseous medium is other than atmospheric air; and forming the at least one metal coating on at least a portion of the rigid plastic layer of the housing to form the laminate.

In one embodiment, the cover consists essentially of a rigid plastic. In another embodiment, the base consists essentially of a rigid plastic. In a further embodiment, each of the base and the cover consist essentially of a rigid plastic. As an example, the step of providing the cover and/or the base comprises injection molding to form the cover and/or the base comprising the rigid plastic layer.

Again, each of the rigid plastic layer and the metal coating may have any suitable thickness. In an exemplary embodiment, however, thickness of the rigid plastic layer is greater than thickness of the metal coating laminated thereto. In one embodiment, the step of forming the at least one metal coating on at least a portion of the rigid plastic layer of the housing comprises sputter coating. In another embodiment, the step of forming the at least one metal coating on at least a portion of the rigid plastic layer of the housing comprises plasma coating. In yet another embodiment, the step of forming the at least one metal coating on at least a portion of the rigid plastic layer of the housing comprises using plating techniques.

BRIEF DESCRIPTION OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

The present invention is beneficially applied in conjunction with any suitable conventional hard disk drive in need of performance improvements. An improved hard disk drive of the invention comprises a composite housing, wherein the composite housing comprises a base and a cover, wherein at least a portion of the composite housing comprises a laminate of at least one rigid (i.e., non-viscoelastic) plastic layer and at least one metal coating thereon.

A disk drive assembly conventionally includes a base to which various components of the hard disk drive are mounted. A cover cooperates with the base to form a housing that defines an encased environment for the disk drive. Any hard disk drive comprises any of a number of suitable components encased within the housing. The components within the hard disk drive include, for example, a spindle motor, which rotates one or more magnetic disks at a constant high speed, and an actuator assembly for writing information to and reading information from circular tracks on the disks. The actuator assembly typically includes a plurality of actuator arms extending toward the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
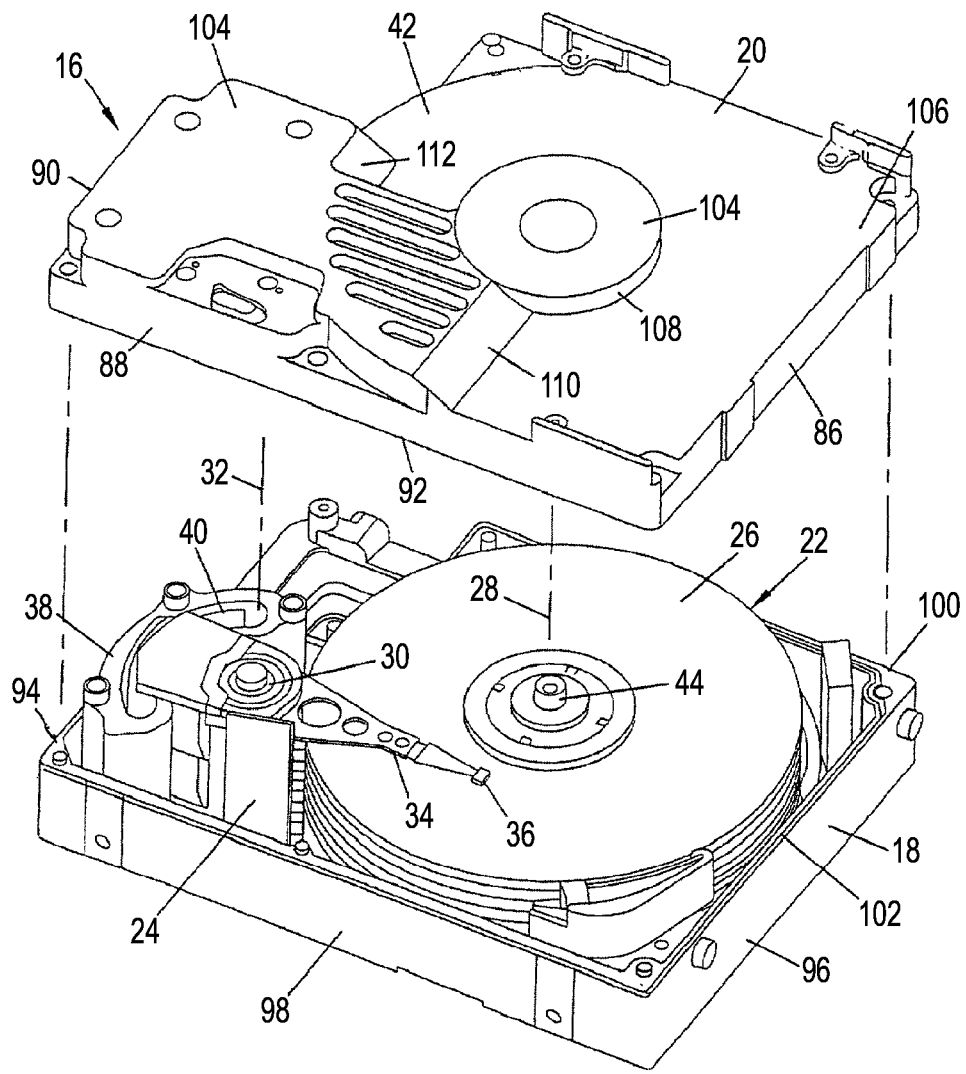
FIG. 1 is a partial perspective view of a prior art hard disk drive with the top cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Several transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at any desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, a sidewall 88, and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes an upright wall structure including a forward wall 94, a rearward wall 96, and two opposed sidewalls, one of which is shown at 98. These walls combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

Advantageously, improved hard disk drives of the invention comprise a composite housing. The composite housing comprises a base and a cover. The housing is understood to be a composite housing in that at least a portion of the housing comprises a laminate of at least one rigid plastic layer and at least one metal coating. According to one aspect of this embodiment, the plastic layer does not function as a viscoelastic material. Rather, in contrast to constrained layer dampers containing an internal viscoelastic material, the plastic layer of composite housings of the invention contributes a majority of the structural strength and rigidity existing in the composite housing. As such, in a preferred embodiment, thickness of the plastic layer is greater than thickness of the metal coating laminated thereto.

Generally, a hard disk drive housing comprises at least two base components—a cover and a base. In an exemplary embodiment, at least one of the two base components (i.e., components assembled together before forming the metal coating thereon) of the hard disk drive housing consists essentially of a non-metallic material (e.g., a rigid plastic). In a further embodiment, each of the two base components of the hard disk drive housing consists essentially of a non-metallic material (e.g., a rigid plastic). Suitable rigid plastic materials include, for example, polycarbonate, polybutylterepthalate, combinations thereof, and the like.

Use of rigid plastic affords many advantages. For example, use of such materials facilitates lighter weight hard disk drives and associated cost savings as they relate to manufacturing and shipping. An exemplary hard disk drive housing according to the invention comprises polycarbonate base components, with the polycarbonate cover weighing about 0.031 pounds (about 14 grams) and the polycarbonate base weighing about 0.026 pounds (about 12 grams).

A further example of advantages afforded by the invention is associated with the fact that many rigid plastics can be efficiently formed using molding techniques (e.g., injection molding). Use of moldable materials facilitates design flexibility in that many performance-enhancing features can be directly molded (e.g., insert-molded) within components of the housing.

The metal coating of the laminate is formed over at least a portion of at least one exterior surface of the base components of the housing, at least a portion of at least one interior surface of the base components of the housing, or a combination thereof. In an exemplary embodiment, the metal coating is formed over essentially the entire exterior surface of the base components of the housing. In a further exemplary embodiment, the composite housing consists essentially of an interior rigid plastic surface and an exterior metallic surface. For example, a major portion of the composite housing may comprise a rigid plastic—e.g., a molded plastic component.

According to one embodiment of the present invention, at least one metal coating is formed over at least a portion of an outwardly exposed, rigid plastic surface of a hard disk drive housing. According to one variation of this embodiment, at least one metal coating is formed over a cover of the hard disk drive housing. While at least one metal coating may also be formed elsewhere on the hard disk drive (e.g., a base of the hard disk drive housing), benefits of the invention may be realized in certain embodiments where essentially only the cover is coated with at least one metal coating according to the invention. For example, such may be the case when the hard disk drive comprises a single platter disk that is exposed to EMI through essentially only the disk drive cover. Advantageously, the at least one metal coating beneficially increases resistance to EMI according to this embodiment.

Figure 2A:
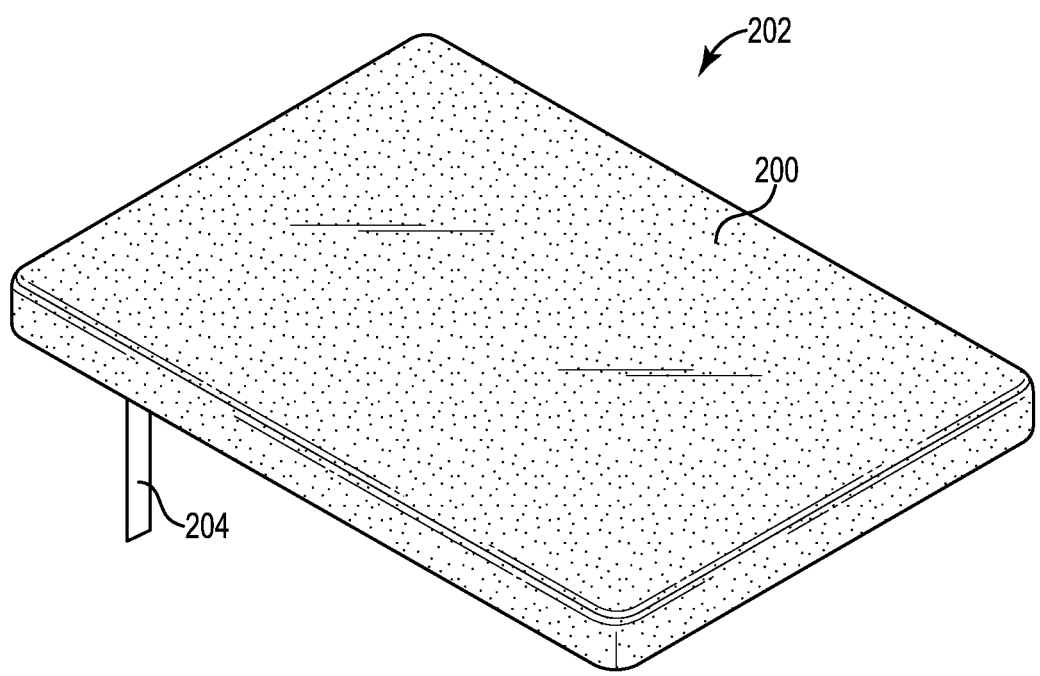
FIG. 2A is a top perspective view of a hard disk drive comprising a composite housing according to the invention.

According to another variation of this embodiment illustrated in FIG. 2A, to provide further advantages, including improved sealing of inert gases within a hard disk drive 202, at least one metal coating 200 is formed over essentially the entire exterior surface of the hard disk drive 202 (i.e., encapsulating an exterior surface of the hard disk drive housing). An optional electrical connector 204 is shown exiting the hard disk drive 202 therein for connection of the hard disk drive 202 to external electrical components.

The at least one metal coating 200 comprises any suitable metal according to the present invention. Understand that, as used herein, the term metal includes metal-containing compounds, such as metal oxides. In general, any metal-containing material capable of being deposited or plated may be coated on the hard disk drive 202 using technologies as known to those of ordinary skill in the art. For example, any sputter coating target material may be used to form the at least one metal coating 200. In an exemplary embodiment, each metal coating 200 according to the invention comprises aluminum, chrome, copper, stainless steel, nickel, or a combination thereof. Understand that the same metal coating 200 need not be applied to the entire exterior surface area of the hard disk drive 202 according to the invention.

The metal coating 200 is typically formed in-situ. The at least one metal coating 200 can be formed using any suitable methodology, including, for example, spray coating (e.g., plasma coating), sputter coating, or plating techniques, as known to those of ordinary skill in the art. For example, the number and duration of passes using sputter coating equipment can vary depending on the nature of the metal, component, and desired properties. Multiple passes to form multiple contiguous layers was found to reduce or eliminate potential problems associate with pinholes or other defects often found in metal coatings. As such, formation of metal coatings 200 using multiple passes is preferred. For example, when coating a hard disk drive 202 housing, two sputter coating passes of about ten seconds each can be used to form an adequate metal coating 200 according to one embodiment of the invention.

As used herein, a metal coating 200 is defined as a single layer or multiple contiguous layers of essentially the same metal. The metal coating 200 may be a continuous layer or a discontinuous layer or multiples thereof. Further, the thickness of a metal coating 200 can vary according to the nature of the surface coated and properties desired. In those embodiments where containment of inert gas within the hard disk drive 202 is of concern, the at least one metal coating 200 comprises more and/or thicker layers. When multiple layers are used, for example, the chance of defects resulting in through paths for undesired EMI and gaseous particles is minimized. The through transmission rate for such particles is essentially zero according to preferred embodiments. In an exemplary embodiment, when the hard disk drive 202 comprises a single platter disk that is exposed to EMI through essentially only the disk drive cover as described above, a thicker metal coating 200 may be formed over the disk drive cover as compared to the remainder of the hard disk drive 202 housing. For ease of manufacture, however, it is often preferred to have a uniformly thick coating of the same metal or combinations thereof on the entire exterior surface of the hard disk drive 202 housing.

Preferably, at least one metal coating 200 comprises multiple layers in order to minimize the possibility of pin holes or other defects negatively impacting shielding or containment properties of the hard disk drive 202. In one embodiment, the metal coating 200 comprises at least two individual layers. In another embodiment, the metal coating 200 comprises at least about four individual layers. In still another embodiment, the metal coating 200 comprises at least about six individual layers. In yet another embodiment, the metal coating 200 comprises at least about ten individual layers. Understand that each individual layer need not be the same thickness or type of metal; although, uniformity thereof is often preferred for process simplicity.

Generally, thickness of the one or more metal coatings 200 depends on the nature of the surface coated and properties desired. Where containment of inert gas within the hard disk drive 202 is of concern, the at least one metal coating 200 has a greater thickness. When alleviation of ESD is the primary concern, the at least one metal coating 200 need not have as great of a thickness. For example, thickness and continuity of the at least one metal coating 200 need only be great enough as that necessary to provide sufficient conductivity to function as a Faraday-type cage when ESD is a primary concern.

According to one aspect of a preferred embodiment of the invention, combined thickness of the one or more metal coatings 200 is about one micron thick. In another embodiment, the combined thickness of the one or more metal coatings 200 is at least about twelve microns thick. In still another embodiment, the combined thickness of the one or more metal coatings 200 is at least about twenty-five microns thick. In yet another embodiment, the combined thickness of the one or more metal coatings 200 is at least about fifty microns thick. In still another embodiment, the combined thickness of the one or more metal coatings 200 is at least about one-hundred microns thick. In yet another embodiment, the combined thickness of the one or more metal coatings 200 is at least about four-hundred microns thick. While the one or more metal coatings 200 may have a greater combined thickness, the combined thickness is less than about two-hundred microns according to an exemplary embodiment. Advantageously, thicker coatings are not needed in order to provide sealing functionality according to the invention. As such, an associated weight savings results and facilitates flexibility in the overall disk drive design.

As noted above, more than one metal coating 200 may be formed on an least a portion of an exterior surface of a hard disk drive 202 housing according to further embodiments of the invention. According to an exemplary aspect of this further embodiment, the most exterior metal coating comprises chrome or stainless steel, exemplary metals that are durable. In one such exemplary embodiment, a copper coating having a thickness of at least about two microns is formed under a stainless steel coating having a thickness of about one micron. Copper, while it may not be as durable or otherwise as desirable as chrome or stainless steel, is preferentially coated underneath another metal coating as it is typically capable of being coated at higher speeds than other metals.

Figure 2B:
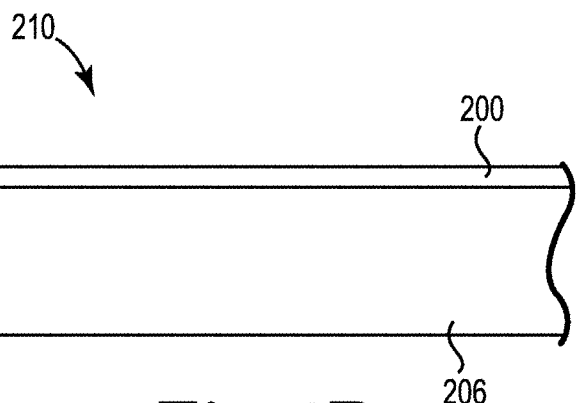
FIG. 2B is a partial cross-sectional view of a cover forming part of the composite housing of FIG. 2A.
Figure 2C:
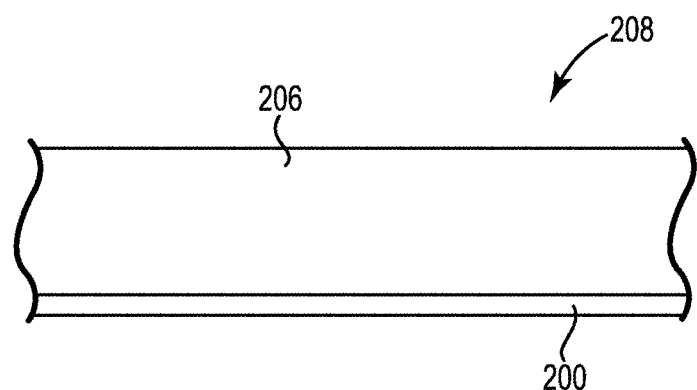
FIG. 2C is a partial cross-sectional view of a base forming part of the composite housing of FIG. 2A.

During exemplary manufacture and assembly of a hard disk drive 202 according to the invention, a cover 210 and a base 208 are formed, as illustrated in FIGS. 2B and 2C. At least one of the cover 210 and the base 208 comprises a rigid plastic material 206. The cover 210 and the base 208 are enclosed around components internal to the hard disk drive 202 within a clean room environment. Any suitable mechanism can be used to couple the base 208 and the cover 210 to form an enclosed housing. Optionally, a sealing material may be positioned between the cover 210 and the base 208 for sealing engagement of the enclosed housing.

In one embodiment, the base 208 and the cover 210 are assembled around components internal to the hard disk drive 202 in not only a clean room environment, but also an environment filled with the desired gaseous medium (when the desired medium is other than atmospheric air). In another embodiment, after enclosing the base 208 and the cover 210 around internal components to the hard disk drive 202 and temporarily sealing the disk drive housing using any suitable methodology as known to those skilled in the art, the hard disk drive 202 is evacuated and filled with the desired gaseous medium (when the desired medium is other than atmospheric air). A fill port or other conventional methodology can be used for filling the hard disk drive 202 with the desired gaseous medium using any suitable methodology as known to those skilled in the art according to this embodiment. The hard disk drive 202 then preferably undergoes routine testing and re-working, if necessary. Once the hard disk drive 202 passes such testing and is further sealed, if necessary or desired, each of the one or more metal coatings 200 is then applied to the desired surface of the hard disk drive 202 housing using any suitable method. The metal coating 200 is formed as such on at least a portion of the enclosed housing. In one embodiment, as illustrated in FIG. 2A, the enclosed housing is suspended by an electrical connector 204 (e.g., flexible circuit) during the metal coating process for processing efficiency.

Advantages associated with hard disk drives 202 and related methods comprising one or more metal coatings 200 of the present invention include, for example, one or more of improved shielding from EMI or ESD as well as improved containment of a gaseous medium within an enclosed hard disk drive 202. Within the sealed environment of hard disk drives 202 of the invention, a gas having a density less than that of atmospheric air can be effectively employed. For example, a gaseous medium comprising at least one of nitrogen, helium, or other noble gases can be employed therein, alone or in combination with one or more of each other and/or air.

In an exemplary embodiment, an improved hard disk drive 202 of the invention is capable of providing and maintaining an adequate sealed environment for at least five years. An adequate sealed environment is one in which hard disk drive 202 performance is not significantly affected due to leakage. According to one embodiment, at least about 90% by volume, preferably at least about 95% by volume, of a gaseous medium originally contained within a hard disk drive 202 remains after five years. Any suitable methodology can be used to detect leakage of a gaseous medium from a hard disk drive 202 and amounts thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. Further, while the present invention has been described with respect to a hard disk drive, it should be understood that the present invention also finds utility in other data storage devices—e.g., optical and magneto-optical storage devices. Further, in order to adequately seal the gaseous medium within the hard disk drive, use of expensive gasket seals is not necessary according to preferred embodiments of the invention. However, such gasket seals may be used, if desired.

The invention claimed is:

1. A hard disk drive comprising a composite housing, wherein the composite housing comprises:
   a base; and
   a cover,
   wherein essentially the entire composite housing comprises a laminate of at least one rigid plastic layer and at least one metal coating, and
   wherein the at least one rigid plastic layer is an interior layer of the composite housing and the at least one metal coating is an exterior layer of the composite housing,
   wherein the at least one metal coating comprises multiple layers and thickness of the at least one metal coating is at least about one micron,
   wherein thickness of the rigid plastic layer is greater than the thickness of the at least one metal coating laminated thereto, and
   wherein the hard disk drive is hermetically sealed.

2. The hard disk drive of claim 1, wherein the at least one metal coating comprises at least one exterior surface of the housing.

3. The hard disk drive of claim 1, wherein the at least one metal coating comprises essentially the entire exterior surface of the housing.

4. The hard disk drive of claim 3, wherein the entire exterior surface of the housing comprises a uniformly thick coating of the same metal or combinations thereof.

5. The hard disk drive of claim 1, wherein the rigid plastic layer comprises polycarbonate, polybutylterepthalate, or a combination thereof.

6. The hard disk drive of claim 1, wherein the metal coating comprises aluminum, chrome, copper, stainless steel, or a combination thereof.

7. The hard disk drive of claim 1, wherein the laminate comprises more than one metal coating and wherein a most exterior metal coating comprises at least one of chrome or stainless steel.

8. The hard disk drive of claim 1, wherein a major portion of the composite housing comprises plastic.

9. The hard disk drive of claim 1, wherein the at least one rigid plastic layer comprises a molded plastic base component of the composite housing.

10. The hard disk drive of claim 1, wherein the thickness of the at least one metal coating is less than about two-hundred microns.

11. The hard disk drive of claim 1, wherein each of the base and the cover consist essentially of the at least one rigid plastic layer with the at least one metal coating.

12. The hard disk drive of claim 1, wherein the thickness of the at least one rigid plastic layer is at least two times as great as the thickness of the least one metal coating.

13. The hard disk drive of claim 1, wherein the rigid plastic layer contributes a majority of structural strength and rigidity existing within the composite housing.

14. The hard disk drive of claim 1, wherein a major portion of the composite housing comprises the rigid plastic layer.

15. The hard disk drive of claim 1, wherein the thickness of the at least one metal coating is at least about twelve microns.

16. The hard disk drive of claim 1, wherein the thickness of the at least one metal coating is at least about twenty-five microns.

17. The hard disk drive of claim 1, wherein the thickness of the at least one metal coating is at least about fifty microns.

18. The hard disk drive of claim 1, wherein the thickness of the at least one metal coating is at least about one-hundred microns.

19. The hard disk drive of claim 1, wherein the thickness of the at least one metal coating is greater than one micron.

20. The hard disk drive of claim 1, wherein the at least one metal coating comprises at least two individual layers.

21. The hard disk drive of claim 1, wherein the at least one metal coating comprises at least about ten individual layers.

22. The hard disk drive of claim 1, wherein the multiple layers of the at least one metal coating minimize a possibility of pin holes or other defects negatively impacting shielding or containment properties of the hard disk drive.

23. The hard disk drive of claim 1, wherein a transmission rate for gaseous particles through the at least one metal coating comprising multiple layers is essentially zero.

24. A method of forming the hard disk drive of claim 1, comprising steps of:
   providing the cover and the base for the housing, wherein at least one of the cover and the base comprises a rigid plastic layer;
   optionally, positioning a sealing material between the cover and the base for sealing engagement of the housing;
   enclosing the cover and the base around components internal to the hard disk drive;
   optionally, evacuating and filling the hard disk drive with a desired gaseous medium when the desired gaseous medium is other than atmospheric air; and
   forming the at least one metal coating on at least a portion of the rigid plastic layer of the housing to form the laminate.

25. The method of claim 24, wherein the step of providing the cover and the base comprises providing a cover consisting essentially of a rigid plastic.

26. The method of claim 24, wherein the step of providing the cover and the base comprises providing a base consisting essentially of a rigid plastic.

27. The method of claim 24, wherein the step of providing the cover and the base comprises providing a base consisting essentially of a rigid plastic and a cover consisting essentially of a rigid plastic.

28. The method of claim 24, wherein the step of providing the cover and the base comprises injection molding the at least one of the cover and the base comprising the rigid plastic layer.

29. The method of claim 24, wherein the step of forming the at least one metal coating on at least a portion of the rigid plastic exterior surface of the housing comprises sputter coating.

30. The method of claim 24, wherein the step of forming the at least one metal coating on at least a portion of the rigid plastic exterior surface of the housing comprises plasma coating.

31. The method of claim 24, wherein the step of forming the at least one metal coating on at least a portion of the rigid plastic exterior surface of the housing comprises using plating techniques.

* * * * *